SIGNAL CYCLING DEVICE

Original Filed April 13, 1950

INVENTORS
JOHN PRESPER ECKERT, JR.
ALBERT A. AUERBACH
BY [signature]
ATTORNEY 2,854,574

SIGNAL CYCLING DEVICE

John Presper Eckert, Jr., Philadelphia, Pa., and Albert A. Auerbach, Levittown, N. Y., assignors, by mesne assignments, to Sperry Rand Corporation, New York, N. Y., a corporation of Delaware Original application April 13, 1950, Serial No. 155,628, now Patent No. 2,687,473, dated August 24, 1954. Divided and this application July 6, 1954, Serial No. 441,298

6 Claims. (Cl. 250—27)

Figures 1, 2A, 2B, 2C:
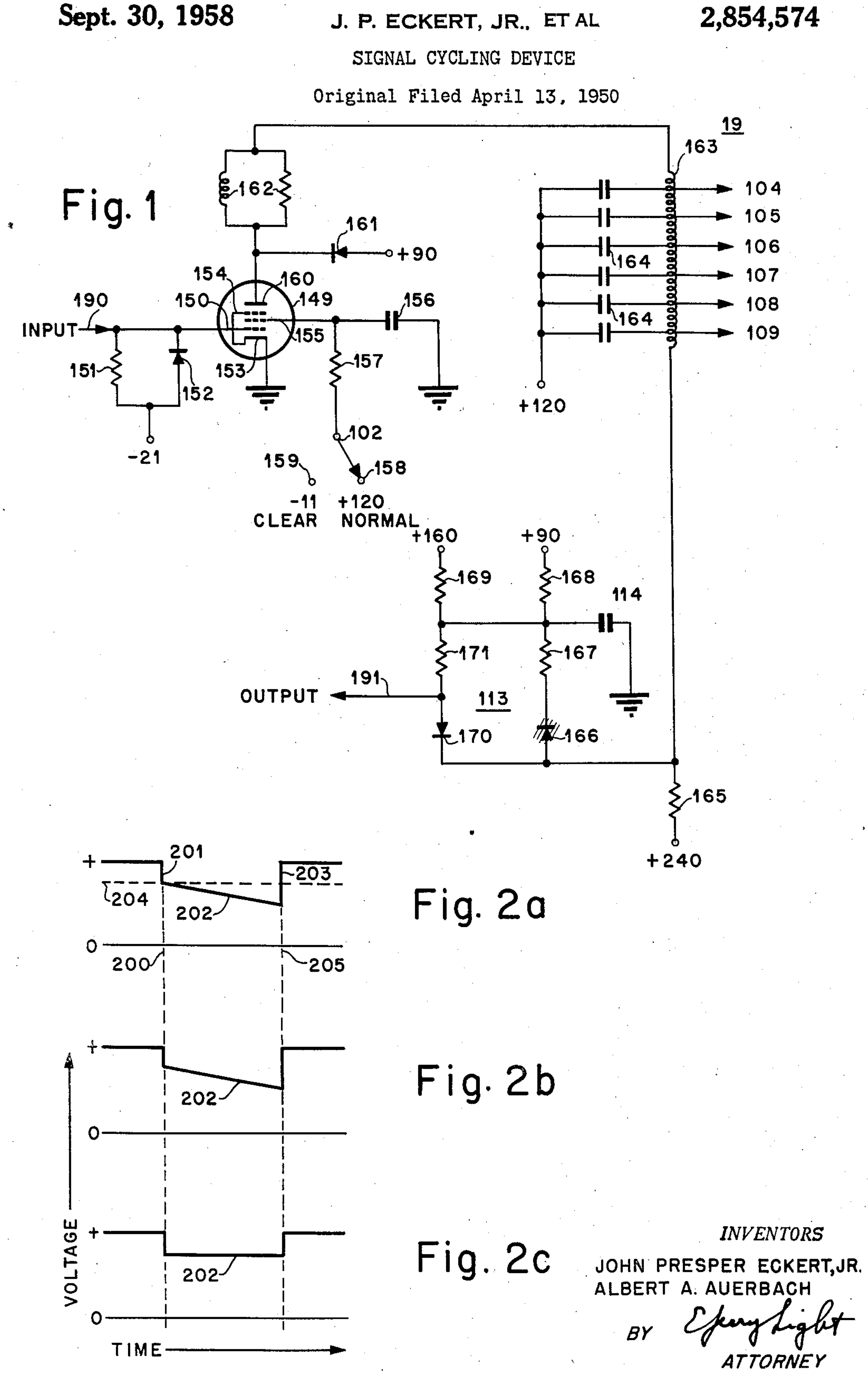

This invention relates to a pulse forming apparatus and more particularly to an apparatus driving an electrical delay line developing a rectangular impulse of a predetermined width in response to an input signal.

This application is a division of our copending application, Serial No. 155,628, now Patent No. 2,687,473, granted August 24, 1954, filed April 13, 1950.

The invention described in the aforementioned application provides for the circulation of a signal impulse in a signal loop comprising a delay line, a pulse forming regenerator and a timing gate, so that once a signal impulse enters the signal loop it continues to circulate therein until the loop is cleared. When used for selective gating or selective sequential activation, it was shown that it was only necessary to utilize a single, preferably rectangular, impulse.

Accordingly, objects of this invention are:

To provide a rectangular impulse of a predetermined width to an electrical delay line in response to an input signal.

To provide a rectangular impulse to an electrical delay line irrespective of the signal configuration of the input thereto.

To provide a rectangular impulse to an electrical delay line from an electric valve.

To insure that the output from an electric delay line driver will be a rectangular impulse.

Other objects of the invention will in part be described and in part be obvious as the following specification is read in conjunction with the drawings in which:

Figure 1 illustrates schematically a circuit embodying the invention, and

Figure 2*a–c* illustrates voltage-time waveforms characterizing the invention.

Referring now to the drawings which illustrate a particular embodiment of this invention, typical values of potential are given for purposes of illustration only and not in order to limit the scope of the invention. Positive voltage sources are identified by even numbers and negative voltage sources are identified by odd numbers. Figure 1 shows an electrical delay or transmission line 19 and a driver valve 149 associated therewith. Valve 149 is normally nonconducting having its control grid 150 connected to a negative bias potential of 21 volts by means of a grid resistor 151, which has a restoring diode 152 connected in parallel with its anode linked to the said negative potential of 21 volts. The cathode 153 of delay line driver valve 149 and the suppressor grid 154 of the said valve are connected together and to ground potential; the screen grid 155 is bypassed to ground by a capacitor 156 and is connected to a control switch 102 which contacts either a normal terminal 158 bearing a positive potential of 120 volts or a clear terminal 159 bearing a negative clearing potential of minus 11 volts. The anode 160 of valve 149 is linked to a positive clamping potential by a clamping diode 161 which has its anode connected to a positive potential source having a voltage determined by later reviewed considerations, and is also connected to a positive potential of 240 volts through a parallel inductor-resistor combination 162, the delay line 19 and anode resistor 165. Delay line 19 is composed of a plurality of mutually coupled series connected inductors 163 connected at their junction to capacitors 164; all the capacitors 164 have one plate returned to a positive potential of 120 volts. The said delay line 19 is provided with a series of tap connections 104 to 109 inclusive along its length for the delivery of signals to apparatus as described and claimed in the aforementioned application.

The junction point of the delay line 19 and the anode resistor 165, is joined to a pair of parallel connected diode resistor branches 113 by connecting to the anode of the normally conducting diode 166 and the cathode of the normally nonconducting diode 170. Diodes 166 and 170 are respectively series connected to a load resistor 167 and a load resistor 171 connecting to a junction point which is returned to a positive potential of 160 volts through a voltage divider resistor 169 and to a potential of 90 volts through a voltage divider resistor 168, and by-passed to ground potential through a hum-filtering capacitor 114. This arrangement is utilized to terminate delay line 19 with its characteristic impedance and so prevent signal reflection into delay line 19, since it is assumed that the impedance of anode resistor 165 will be higher than the characteristic impedance of delay line 19.

In operation, the delay line driver valve 149 has its control grid 150 maintained, by means of the restorer diode 152, at a potential which cannot become more negative than a potential of minus 21 volts, so that when a positive impulse of sufficient magnitude is transmitted thereto via terminal 190 in Figure 1, by apparatus not shown, the said valve 149 will, in response, normally become conductive. When the control switch 102 is placed in the clear position, control grid 150 is held below cutoff and the delay line driver valve 149 does not become conductive in response to positive signals upon its control grid 150, thereby preventing the transmission of signals to the delay line 19. The parallel inductor-resistor combination 162 prevents ringing or oscillations in the anode circuit of said delay line driver valve 149, allowing a signal of substantially rectangular wave form to appear in this circuit in response to a positive impulse on the control grid 150.

The anode voltage excursion of the driver valve 149 is limited to the lower level of 90 volts by the normally nonconducting clamping diode 161 and to an upper level dependent upon the voltage drop through the anode resistor 165. In the foregoing discussion, the connection of the clamping diode 161 between the anode 160 of the valve 149, and a potential of approximately 90 volts has been mentioned. The purpose of this clamp is to shorten the time between the arrival of a positive-going impulse at the control grid 150 of the valve 149 and the development of the maximum negative-going excursion at the anode 160. A consideration of the diagrams in Figure 2*a*, *b* and *c* will make clear the requirement for the diode 161 and the manner of selecting the potential to which it is returned.

Referring now to Figure 2*a*, it is assumed that a positive-going impulse is applied to the control grid 150 at a time 200. The resulting anode current surge, taken in conjunction with the surge impedance of the line 19, produces an immediate voltage change indicated by the negative-going stroke 201 across the delay line 19. The anode current continues to flow, however, and as it is propagated down the delay line, passes successively through section after section thereof. Each of these sections has an appreciable resistance, and as the current traverses additional sections, the anode 160 becomes progressively more negative by the amount of the additional drop contributed, as indicated by the section 202 of the voltage-time characteristic in Figure 2*a*. At the time 205, the control electrode 150 returns to cut-off potential, interrupting the flow of anode current, permitting the anode potential to return to its rest value along the postiive-going stroke 203.

Inspection of the Figure 2*a* reveals that the negative excursion of the anode 160 continues during the presence of the positive-going grid excitation impulse, whereby the time required for the anode 160 to reach the maximum negative excursion is very considerable. Without the diode 161, the form of the voltage wave available from the tap 104 on delay line 19, for example, would be approximated by Figure 2*b*. However, by clamping the anode 160 against further excursion at the voltage level indicated by the dashed line 204 in Figure 2*a*, the time required for the signal to attain its final value is greatly reduced, through the elimination of the sloping stroke 202. To perform this function, the diode 161 is provided, and returned to a potential which must be at least as positive as the remainder after the subtraction of the initial surge from the anode rest potential. The initial surge magnitude is, of course, determined by measurement or multiplying the anode current surge by the line surge impedance. A less positive clamping potential would permit a portion of the sloping stroke 202 to get through the circuits. A more positive clamping potential will do no harm to the general form of the impulses, but merely reduce the peak amplitude available. The voltage excursion of anode 160 of valve 149 which is also the voltage wave available from any of the taps 104 to 109 on delay line 19 is obtained as in Figure 2*c*.

The said negative impulse traverses the delay line 19 which interposes a delay of the magnitude desired. Upon reaching the load end of the delay line 19, the negative impulse is impressed on the two parallel connected diode resistor branches 113, resulting in the nonconduction of normally conducting diode 166 and the conduction of diode 170 which transmits a negative impulse via the terminal 191 in Figure 1 to apparatus, not shown, where the negative pulse may be retimed, amplified and reformed and applied as the positive impulse to the grid 150 of valve 149 as described and claimed in the aforementioned application.

While this invention has been described and illustrated with reference to a specific embodiment, it is to be understood that the invention is capable of various modifications and applications, not departing essentially from the spirit thereof, which will become apparent to those skilled in the art.

What is claimed is:

1. In combination, an electric delay line connected at one end with a conductor having a first potential, an electric valve connected between the other end of said delay line and a conductor having a second potential, and a diode connected between the electric valve end of said delay line and a conductor having a reference potential intermediate said first and second potentials.

2. In combination, an electric delay line connected at one end with a conductor having a first potential, an electric valve connected between the other end of said delay line and a conductor having a second potential, said valve having the property of passing a current surge of predetermined magnitude in response to the application of signal stimuli thereto, and a diode connected between the electric valve end of said delay line and a conductor having a potential not less than the difference between said first potential and the product of the surge impedance of said delay line by the magnitude of said current surge.

3. In combination, an electric driver tube having anode, cathode and grid electrodes, a source of anode supply potential for said driver tube, an electric delay line connecting said source of potential to the anode of said tube, and a clamping circuit connected to the junction of said delay line and said anode including a source of reference voltage and a unilateral conductor connected in series, said reference voltage having a potential lower than said anode potential.

4. In combination, a delay line, an electric valve, the output of which is connected to the input of said delay line, means for preventing oscillation in the output circuit of said valve interposed between said valve and said delay line, a clamping device connected to the junction of said valve and of said means for preventing oscillation, a voltage source connected to the output end of said delay line, an impedance interposed between said output end of said delay line and said voltage source, and means for terminating said delay line connected to the junction of said impedance and of said delay line.

5. The combination according to claim 4 wherein said means for preventing oscillation comprise an inductor and resistor arranged in parallel.

6. The combination according to claim 4 wherein said clamping device comprises an asymmetrical conductor and a voltage source.

References Cited in the file of this patent

UNITED STATES PATENTS

| | | |
|---|---|---|
| 2,266,401 | Reeves | Dec. 16, 1941 |
| 2,299,571 | Dome | Oct. 20, 1942 |
| 2,521,952 | Stephenson | Sept. 12, 1950 |
| 2,632,847 | Reed | Mar. 24, 1953 |